(12) United States Patent
Aizawa

(10) Patent No.: US 8,855,424 B2
(45) Date of Patent: Oct. 7, 2014

(54) WORD RECOGNITION METHOD, WORD RECOGNITION PROGRAM, AND INFORMATION PROCESSING DEVICE

(75) Inventor: Tomoyoshi Aizawa, Kusatsu (JP)

(73) Assignee: OMRON Corporation, Kyoto (JP)

( * ) Notice: Subject to any disclaimer, the term of this patent is extended or adjusted under 35 U.S.C. 154(b) by 338 days.

(21) Appl. No.: 12/916,382

(22) Filed: Oct. 29, 2010

(65) Prior Publication Data

US 2011/0158548 A1 Jun. 30, 2011

(30) Foreign Application Priority Data

Dec. 29, 2009 (JP) ................................. 2009-299227

(51) Int. Cl.
*G06K 9/18* (2006.01)
*G06K 9/72* (2006.01)

(52) U.S. Cl.
CPC ...................................... *G06K 9/723* (2013.01)
USPC .......................................... 382/182; 382/229

(58) Field of Classification Search
None
See application file for complete search history.

(56) References Cited

U.S. PATENT DOCUMENTS

| | | | | | |
|---|---|---|---|---|---|
| 4,764,972 | A | * | 8/1988 | Yoshida et al. | 382/187 |
| 5,768,451 | A | * | 6/1998 | Hisamitsu et al. | 382/309 |
| 6,246,794 | B1 | | 6/2001 | Kagehiro et al. | |
| 7,379,603 | B2 | * | 5/2008 | Ross et al. | 382/229 |
| 2007/0239425 | A1 | * | 10/2007 | Fux | 704/3 |
| 2008/0228469 | A1 | * | 9/2008 | Ross et al. | 704/10 |
| 2009/0180683 | A1 | * | 7/2009 | Lee et al. | 382/156 |

FOREIGN PATENT DOCUMENTS

| | | |
|---|---|---|
| JP | 5-46814 | 2/1993 |
| JP | 540854 A | 2/1993 |
| JP | 8249427 A | 9/1996 |
| JP | 991386 A | 4/1997 |
| JP | 2006-163830 | 6/2006 |
| KR | 1999-0036515 | 5/1999 |
| KR | 10-0411697 | 3/2004 |
| KR | 2007-0067646 A | 6/2007 |
| WO | 2005036413 A1 | 4/2005 |

OTHER PUBLICATIONS

U.S. Appl. No. 12/325,786, filed Jan. 2008, Williams, Jason.*

(Continued)

*Primary Examiner* — Jason M Repko
*Assistant Examiner* — Ryan P Potts
(74) *Attorney, Agent, or Firm* — Osha Liang LLP

(57) ABSTRACT

A word recognition method in which as a result of a recognition process performed on an image of a character string, one or more character candidates are obtained for each of characters forming the character string, according to which a word corresponding to the character string is recognized using a word database having registered therein a plurality of words includes setting a predetermined number of words included in the word database, as initial word candidates, performing a process in which the characters forming the recognition target character string are set as processing targets, one character by one character, and every time a processing target character is set, word candidates present at a time of the setting are narrowed down to words in which character candidates obtained for the processing target character are arranged at a same location as a location where the processing target character is arranged in the recognition target character string, and identifying, when a narrowing-down process performed on a last processing target character in the recognition target character string is completed, a word corresponding to the character string from among word candidates extracted at a point in time of the completion of the narrowing-down process.

6 Claims, 10 Drawing Sheets

(56) References Cited

OTHER PUBLICATIONS

Machine Translation of JP-05040854-A, using http://dossier1.ipdl.inpit.go.jp/AIPN/odse_top_dn.ipdl?N0000=7400, translated on Nov. 5, 2013, 6 pages.*

Office Action Issued in South Korean Application No. 10-2010-0103284, Dated Oct. 26, 2011 (8 Pages with Translation).
Mechanical English translation of Japanese patent application, Publication No. 2006-163830, Publication Date: Jun. 22, 2010, 44 pages.
Mechanical English translation of Japanese patent application, Publication No. 05-046814, Publication Date: Feb. 26, 1993, 6 pages.

* cited by examiner

*FIG. 5*

|  |  | FIRST CHARACTER | SECOND CHARACTER | THIRD CHARACTER | FOURTH CHARACTER |
|---|---|---|---|---|---|
| CHARACTER CANDIDATE | 1 | 五(85) | 三(93) | 丸(89) | 度(95) |
| | 2 | 玉(83) | 五(85) | 九(88) | 庚(87) |
| | 3 | 王(81) | 日(83) | 之(84) | 庄(62) |
| | 4 | 三(80) | 王(55) | 先(65) | 序(58) |
| | 5 | 二(65) | 二(54) | 允(52) | 痺(45) |

FIG. 6

|  |  | FIRST CHARACTER | SECOND CHARACTER | THIRD CHARACTER | FOURTH CHARACTER |
|---|---|---|---|---|---|
| CHARACTER CANDIDATE | 1 | 五 | 三 | 丸 | 度 |
|  | 2 | 玉 | 五 | 九 | 庚 |
|  | 3 | 王 | 日 | 之 | 庄 |
|  | 4 | 三 | 王 | 先 | 序 |
|  | 5 | 二 | 二 | 允 | 痺 |

|  | ASSEMBLED CHARACTER STRING | | | | RESULT OF CHECKING |
|---|---|---|---|---|---|
|  | FIRST CHARACTER | SECOND CHARACTER | THIRD CHARACTER | FOURTH CHARACTER | |
| 1ST | 五 | 三 | 丸 | 度 | × |
| 2ND | 玉 | 三 | 丸 | 度 | × |
| 3RD | 王 | 三 | 丸 | 度 | × |
| 4TH | 三 | 三 | 丸 | 度 | × |
| 5TH | 五 | 五 | 丸 | 度 | × |
| ⋮ | ⋮ | ⋮ | ⋮ | ⋮ | ⋮ |
| nTH | 三 | 三 | 九 | 度 | ○ |

WORD RECOGNITION METHOD, WORD RECOGNITION PROGRAM, AND INFORMATION PROCESSING DEVICE

BACKGROUND OF THE INVENTION

1. Technical Field

The present invention relates to a technique in which by a recognition process targeted for an image of a character string which is created by a camera, a drawing process, etc., character candidates for each of characters forming the character string are derived together with their reliabilities, according to which a word corresponding to the character string is recognized.

2. Related Art

In a general character recognition process, after an image of a recognition target character string is binarized, areas where individual characters are present are individually cut out from the binarized image. Then, an image in each area is checked against model images registered for the respective types of characters, and a character corresponding to a model image that is used when the highest similarity is obtained is identified as a character corresponding to a character in the image.

Note, however, that since erroneous recognition may occur, depending on the state of a processing target image, recognition processing methods taking into account the above are proposed. For example, Japanese Unexamined Patent Publication No. 5-46814 describes that a dictionary is searched using a character string generated by recognized characters and if the same character string as the search target character string is found in the dictionary, then a recognition result is determined to be correct and thus the character string is determined; on the other hand, if the same character string as the search target character string is not found, then a character recognition process is performed again.

Japanese Unexamined Patent Publication No. 2006-163830 describes, for example, that after a plurality of combinations of recognition candidate characters and recognition reliabilities are created for each of characters included in character recognition target data, word candidates are generated by combining recognition candidate characters in a plurality of ways, a word dictionary is searched using the word candidates in decreasing order of priority to narrow down information (dictionary words) included in the word dictionary, and a dictionary word whose similarity to a word candidate is highest is selected from the narrowed-down dictionary words.

SUMMARY

As in the above-described documents, when a method is adopted in which a word database is checked using combinations of character candidates, a large number of combinations may be set and thus the processing time may become long, which will be described below using a specific example.

FIG. 10A shows an image created by imaging the character string "三三 九度", as an example of an image of a character recognition target. FIG. 10B shows, in a table format, character candidates derived by a recognition process performed on four characters in the image. In this example, five character candidates are obtained for each character and the character candidates are arranged in decreasing order of reliability.

Note that the "reliability" as used herein is set based on similarity between a character area and a model image of a character, which is obtained when the character area cut out from the image is checked against the model image of a character.

According to an example shown in FIG. 10B, for the second character "三" and the fourth character "度" in the recognition target character string, the correct characters are set as their highest ranked character candidates; however, for the first character "三" and the third character "九", wrong characters are set as their highest ranked character candidates.

FIG. 10C shows an exemplary combination of character candidates shown in FIG. 10B and a result of checking a word database using a character string generated by the combination, in an association manner (the symbol "x" indicates that a corresponding word has not been found and the symbol "○" indicates that a corresponding word has been found). In this example, a combination is set by selecting the character candidates in decreasing order of reliability and a character candidate in the combination is changed one character by one character each time and the resulting combination of character candidates are checked against words in the word database. However, since wrong characters are set as the highest ranked character candidates, it takes a long time to achieve successful checking. Hence, it requires a considerable amount of time to identify the correct word. In addition, according to this method, the longer the character string length of a recognition target character string, the larger the number of combinations of character candidates, and accordingly, the time required for the process also gets longer.

As such, in the above-described method, although the correct word can be recognized, the processing time is likely to become very long and thus it is difficult to apply the method to a device of a type that performs this process in parallel with other processes. For example, in a mobile phone having a character recognition function set therein, when an incoming call is received while a character recognition process is performed, there is a need to output sound effects and provide display to notify of the incoming call. However, if the character recognition process is prolonged, then informing of the incoming call cannot be performed promptly, which may cause trouble in the basic functionality of the mobile phone.

One or more embodiments of the present invention reduces the time required for a process of identifying a word corresponding to a recognition target character string.

In accordance with one aspect of the present invention, in a word recognition method, as a result of a recognition process performed on an image of a character string, one or more character candidates are obtained for each of characters forming the character string, according to which a word corresponding to the character string is recognized using a word database having registered therein a plurality of words. Note that, in the recognition process performed on the image of a character string, it is desirable that each character candidate be set with reliability obtained based on similarity derived by checking the character candidate against a model image upon character recognition. For a numerical value indicating the level of reliability, the numerical value may change to a greater value as the level of reliability increases, or the numerical value may change to a smaller value as the level of reliability increases.

In the word recognition method in accordance with one aspect of the present invention, a predetermined number of words included in the word database are set as initial word candidates. Then, a process is performed in which the characters forming the recognition target character string are set as processing targets, one character by one character, and every time a processing target character is set, word candidates present at a time of the setting are narrowed down to words in which character candidates obtained for the processing target character are arranged at a same location as a location where the processing target character is arranged in the recognition target character string.

Note that the process of "setting a predetermined number of words included in the word database, as initial word candidates" indicates a process of extracting some words included in the word database as initial word candidates, and also a process of setting all of the words included in the word database as initial word candidates. In other words, the first narrowing-down process may be performed on some words included in the word database, or the first narrowing-down process may be performed on all of the words included in the word database.

Furthermore, in the word recognition method in accordance with one aspect of the present invention, when a narrowing-down process performed on a last processing target character in the recognition target character string is completed, a word corresponding to the character string is identified from among word candidates extracted at a point in time of the completion of the narrowing-down process.

According to the above-described method, even if at first a large number of words are set as word candidates, regardless of the degree of similarity of a recognition target character string, by setting characters forming the recognition target character string, as processing targets, one character by one character, and performing a word candidate narrowing-down process on each processing target character, the number of word candidates gradually decreases. In addition, even when a word in which some characters match character candidates is included in initial word candidates, such a word is excluded from word candidates by a narrowing-down process performed on a character that is present at a different location and that does not match any character candidate. Thus, only a word candidate can be left finally that is a character string in which character candidates for the respective component characters in the recognition target character string are arranged at the same locations as their corresponding component characters, and that is registered in the word database as a word.

In addition, according to the method, instead of performing checking on a character string basis, as do the conventional cases, one character in a word is checked against character candidates. Thus, the load on checking is reduced. Moreover, as the process proceeds, the number of word candidates to be checked decreases, enabling to significantly reduce the processing time over the conventional cases.

In a preferred aspect of the above-described method, every time a processing target character is set, a process may be performed in which character candidates having reliabilities exceeding a permitted value which is obtained based on a condition predetermined in the recognition process are extracted from among character candidates obtained for the processing target character in the recognition process, and word candidates are narrowed down using exclusively the extracted character candidates.

Even when the correct character is not set as the highest ranked character candidate due to an error in character recognition, as long as it is the correct character, a certain degree of reliability can be obtained. Thus, for example, by setting a condition that allows to stably extract the correct character as a character candidate, based on experimental character recognition results, and extracting character candidates having reliabilities exceeding a permitted value which is obtained based on the above-described condition, from character candidates obtained for a processing target character, a word corresponding to a recognition target character string can be prevented from being excluded from word candidates and the number of character candidates can be limited.

More preferably, a condition for extracting character candidates may be such that reliability is obtained which exceeds a predetermined threshold value and whose difference from the maximum reliability among the reliabilities of character candidates for a processing target character is within a predetermined fixed value. By setting such a condition, even if character candidates are those that have reliabilities exceeding the threshold value, those character candidates whose reliabilities greatly differ from the maximum reliability can be excluded from the narrowing-down range. Thus, character candidates that are highly likely to become noise can be cut down.

In another preferred aspect of the word recognition method, of the words registered in the word database, words whose numbers of component characters match that of the recognition target character string may be set as initial word candidates. By setting in this manner, at first, all of those words whose numbers of component characters match that of the recognition target character string are set as word candidates, but by setting the component characters of the recognition target character string as processing targets in turn, and performing a narrowing-down process, word candidates can be finally narrowed down to one that is a character string in which character candidates for the respective component characters are arranged at the same locations as their corresponding component characters, and that is registered in the word database as a word.

In still another preferred aspect of the word recognition method, when a plurality of word candidates are extracted upon completion of the narrowing-down process performed on the last processing target character in the recognition target character string, for each of the word candidates an average value of reliabilities of character candidates for respective characters that form the word candidate may be calculated, and a word candidate with a highest average value of reliabilities may be identified as a word corresponding to the character string.

In general, a word that perfectly matches a recognition target character string is such that all component characters thereof obtain high reliabilities upon a character recognition process, and thus, it is highly likely that the average value of reliabilities thereof is higher than those of other similar words. Therefore, by identifying, as a word corresponding to the character string, a word candidate with the highest average value of reliabilities from among word candidates left finally, the probability of being able to properly recognize a corresponding word can be increased.

In accordance with another aspect of the present invention, a word recognition program causes a computer in which a word database having registered therein a plurality of words is set and as a result of a recognition process performed on an image of a character string, one or more character candidates are obtained for each of characters forming the character string, to perform a process of recognizing a word corresponding to the character string. The program causes the computer to function as the following initial setting unit, narrowing-down unit, word identifying unit, and output unit.

The initial setting unit initially sets a predetermined number of words registered in the word database, as word candidates. Note that the initial setting unit may set some words included in the word database as initial word candidates, or may set all of the words included in the word database as initial word candidates.

The narrowing-down unit performs a process in which the characters forming the recognition target character string are set as processing targets, one character by one character, and every time a processing target character is set, word candidates present at a time of the setting are narrowed down to words in which character candidates obtained for the processing target character are arranged at a same location as a location where the processing target character is arranged in the recognition target character string.

The word identifying unit identifies, when a narrowing-down process performed on a last processing target character in the recognition target character string is completed, a word corresponding to the character string from among word candidates extracted at a point in time of the completion of the narrowing-down process. The output unit outputs the word identified by the word identifying unit, as a recognition result.

According to the above-described word recognition program, a computer having a character recognition function is further set with a function of identifying a word corresponding to a recognition target character string, whereby a process of recognizing a word corresponding to a recognition target character string can be performed with high accuracy and at high speed.

The output unit is configured as, for example, a unit that displays a word identified by the word identifying unit on a monitor, but the configuration is not limited thereto and the output unit can also output electronic data representing an identified word. In addition, when a recognition character string is assembled by selecting character candidates with high reliabilities on a priority basis from among derived character candidates in a character recognition process, the program can include a program that causes the computer to function as a unit that corrects a recognition character string by an identified word.

In accordance with still another aspect of the present invention, an information processing device includes: a word database having registered therein a plurality of words; a character recognizing unit that performs a recognition process on an image of a character string to obtain one or more character candidates for each of characters forming the character string; and a word recognizing unit that recognizes a word corresponding to the character string, using the word database and recognition results obtained by the character recognizing unit. The information processing device in accordance with still another aspect of the present invention further includes an initial setting unit, a narrowing-down unit, a word identifying unit, and an output unit which are implemented by the above-described program.

According to one or more embodiments of the present invention, based on character candidates obtained by a recognition process performed on an image of a character string, word candidates are efficiently narrowed down from a word database, whereby a process of identifying a word corresponding to the character string in the image can be performed at high speed.

BRIEF DESCRIPTION OF THE DRAWINGS

FIG. 5 is a diagram showing, in a table format, results of a character recognition process performed on a recognition target character string;

FIG. 6 is a diagram showing a state in which word candidates are narrowed down by a checking process based on character candidates;

DETAILED DESCRIPTION

Figure 1:
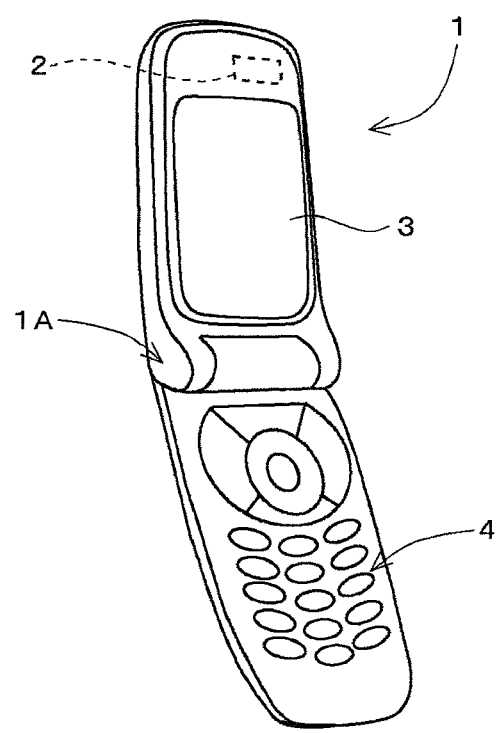
FIG. 1 is a diagram showing an external appearance of a mobile phone having installed thereon a character recognition application.
Figure 2:
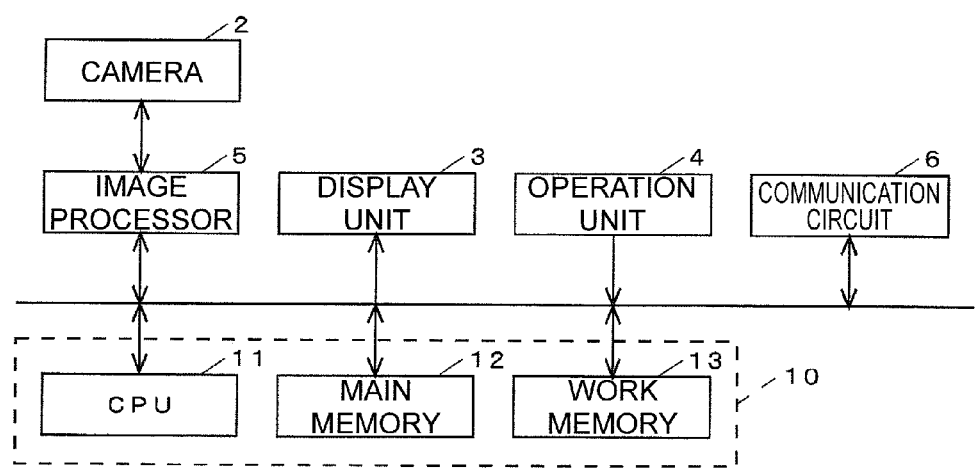
FIG. 2 is a block diagram showing a configuration of the mobile phone.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 shows an external appearance of a mobile phone to which one or more embodiments of the present invention is applied, and FIG. 2 shows an electrical configuration of the mobile phone.

A mobile phone 1 according to one or more embodiments of the present invention is configured such that a camera 2, an image processor 5, a communication circuit 6, a control circuit 10, etc., are contained in a casing 1A having provided thereon a display unit 3 and an operation unit 4. The display unit 3 is configured by a liquid crystal panel. The operation unit 4 has a plurality of keys including a numeric keypad arranged therein.

The camera 2 is a digital camera having a CCD or CMOS, and is connected to the control unit 10 through the image processor 5. The image processor 5 drives the camera 2 based on an instruction from a CPU 11 in the control unit 10, and outputs image data outputted from the camera 2, to the CPU 11.

The control unit 10 includes a main memory 12, a work memory 13, etc., in addition to the CPU 11. The main memory 12 is a nonvolatile memory such as flash memory and saves a program, data for settings, etc. On the other hand, the work memory 13 is a volatile memory (RAM) and is used for the purpose of temporarily saving image data generated by the camera 2, character candidates and word candidates which will be described later, etc.

Figure 3:
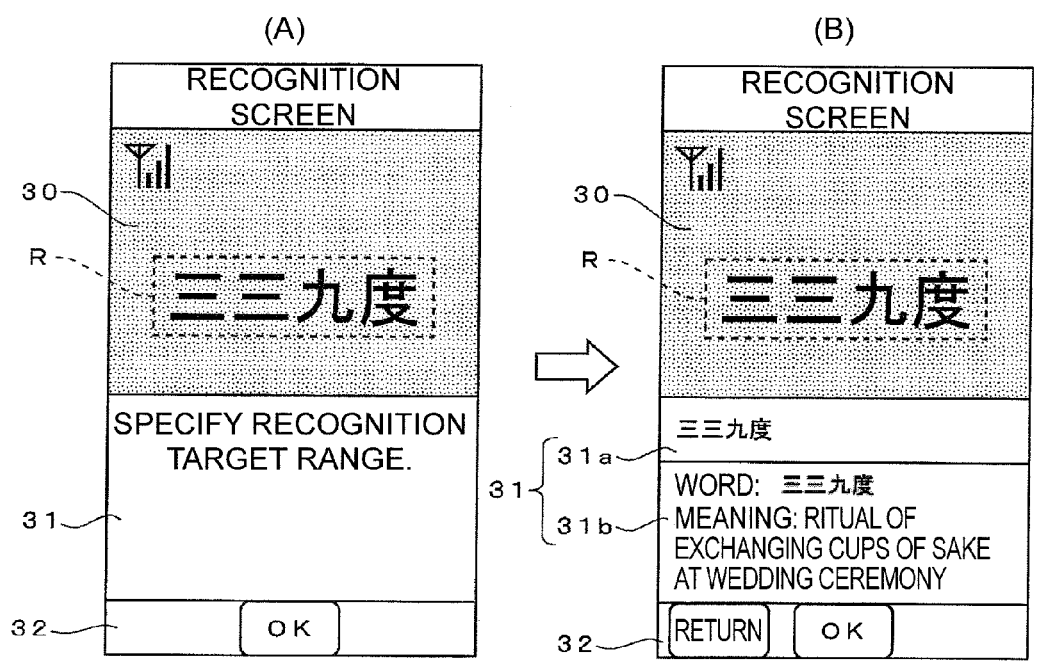
FIG. 3 is a diagram showing examples of a screen presented by the character recognition application.

An application that performs character recognition on an image generated by photographing a character string is installed on the control unit 10 of the mobile phone 1. FIG. 3 shows examples of a screen presented on the display unit 3, according to the recognition process.

The screen in the examples is provided with an area 31 for displaying a message, a recognition result, etc., and an area 32 displaying the functions of keys to be operated, in addition to an area 30 where an image inputted from the camera 2 is displayed.

A screen (A) on the left in the drawing shows a state before a series of recognition processes are performed. A frame R indicating an extraction range of a recognition target character string is displayed so as to be superimposed on an image displayed in the area 30. In the area 31, a message urging to specify a recognition target range is displayed. With respect to this display, a user checks the range of the frame R, makes a modification if necessary, and performs a determination operation. According to this operation, a process of recognizing a character string in the frame R is performed, and the screen changes from the state (A) to the state (B). The area 31 of the screen after the change is divided into a field 31a that displays a recognized character string; and a field 31b that displays dictionary data on the character string. In the fields, their respective relevant information is displayed.

Figure 4:
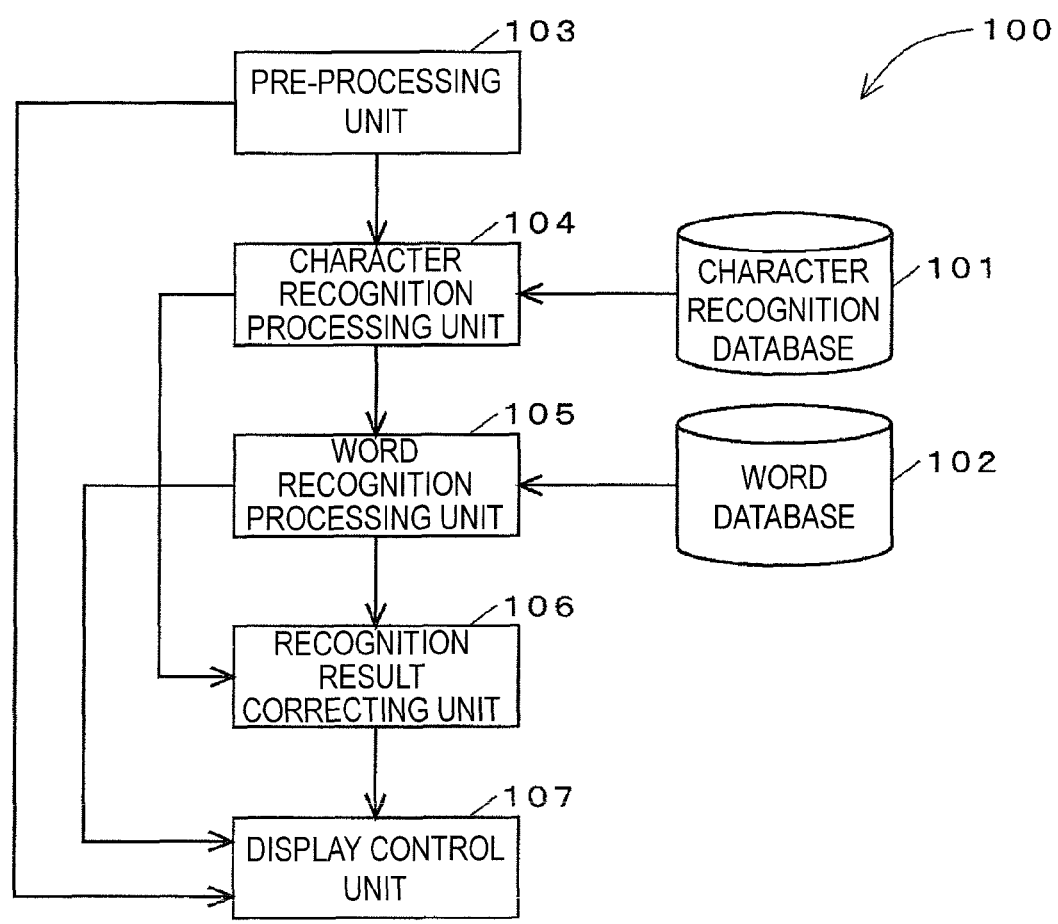
FIG. 4 is a functional block diagram showing a configuration of the character recognition application.

FIG. 4 is a functional block diagram showing a configuration of the above-described character recognition application. This application 100 includes a character recognition database 101, a word database 102, a pre-processing unit 103, a character recognition processing unit 104, a word recognition processing unit 105, a recognition result correcting unit 106, a display control unit 107, etc. Of them, the character recognition database 101 and the word database 102 are data files stored in the main memory 12, and the entities of other components are the CPU 11 that is caused to operate by a program stored in the main memory 12.

In the character recognition database 101, model images of a plurality of types of characters are registered in association with data representing the characters (code information such as JIS code). In the word database 102, a character string representing the notation of a word and dictionary data representing meaning, etc., of the word are registered for a plurality of words.

When the application 100 starts, the image processor 5 allows the camera 2 to perform imaging every certain period of time and outputs generated images to the application 100. The pre-processing unit 103 captures an image every time the image is outputted from the image processor 5 and extracts an amount of change from an immediately preceding image. Furthermore, if the extracted amount of change is below a predetermined threshold value, then the pre-processing unit 103 extracts an area including a character string from an image at that point in time and notifies the display control unit 107 of the location and size of the area.

The display control unit 107 provides a screen shown in FIG. 3 on the display unit 3, and displays an image supplied from the image processor 5 in the area 30. In addition, when the display control unit 107 obtains the location and size of the area including the character string by the notification from the pre-processing unit 103, the display control unit 107 performs, based on the obtained information, a process of displaying a frame R such that the frame R is superimposed on the image being displayed, a process of displaying a message in the area 31, etc.

When on the above-described screen display the user performs an operation to determine a recognition target range indicated by the frame R, the character recognition processing unit 104 performs a recognition process on an image in the determined range. This process is the same as that performed conventionally but will be briefly described below.

First, the character recognition processing unit 104 binarizes an image in the frame R and projects the binarized image in horizontal and vertical directions and thereby extracts areas where individual characters are present (character areas). Then, for each extracted character area, similarity is calculated by checking an image in the area against the model images of characters in the character recognition database 101, and characters corresponding to model images whose similarities exceed a predetermined threshold value are set as character candidates. Furthermore, the set character candidates are set in combination with similarities calculated upon the above-described checking process, as reliabilities. With this, when a character string is included in a specified range, for each of the characters forming the character string, one or more combinations of character candidates and reliabilities can be obtained. Furthermore, the character recognition processing unit 104 in one or more embodiments of the present invention combines the highest ranked character candidates for the respective characters and sets a character string generated by the combination as a character string indicating a recognition result.

In the following, a character string to be recognized by the character recognition processing unit 104 (character string included in the frame R) is referred to as a "recognition target character string" and a character string set as a recognition result by the character recognition processing unit 104 is referred to as a "recognition result character string". In one or more embodiments of the present invention, while a recognition result character string is provided to the recognition result correcting unit 106, combinations of character candidates for the respective characters and reliabilities are provided to the word recognition processing unit 105. Based on the provided information, the word recognition processing unit 105 identifies a word corresponding to the recognition target character string, regardless of the recognition result character string. The recognition result correcting unit 106 compares the word identified by the word recognition processing unit 105 with the recognition result character string. If the two do not match, then the recognition result correcting unit 106 replaces the recognition result character string by the word identified by the word recognition processing unit 105.

The word recognition processing unit 105 performs a checking process which uses the word database 102, using the character candidates set by the character recognition processing unit 104, and thereby gradually narrows down candidates for a word that is likely to correspond to the recognition target character string (hereinafter, referred to as "word candidates"). The word recognition processing unit 105 further identifies a word corresponding to the recognition target character string from among word candidates narrowed down finally, and reads dictionary data on the word from the word database 102. The identified word is provided to the recognition result correcting unit 106 and the dictionary data is provided to the display control unit 107.

The display control unit 107 displays a screen (B) shown in FIG. 3, using a recognition result character string having been subjected to a process performed by the recognition result correcting unit 106 and the dictionary data provided from the word recognition processing unit 105. With this, the user is notified of a recognition result.

FIG. 5 shows, in a table format, recognition results obtained by the character recognition processing unit 104 for a character string (recognition target character string) included in a specified range in the screen (A) in FIG. 3. In one or more embodiments of the present invention, it is assumed that four component characters in the recognition target character string "三三九度" are properly cut and five character candidates are set for each character. FIG. 5 shows, for each component character, character candidates associated with their reliabilities and arranged in decreasing order of reliability. Note that the unit of reliability is %.

Figure 6:
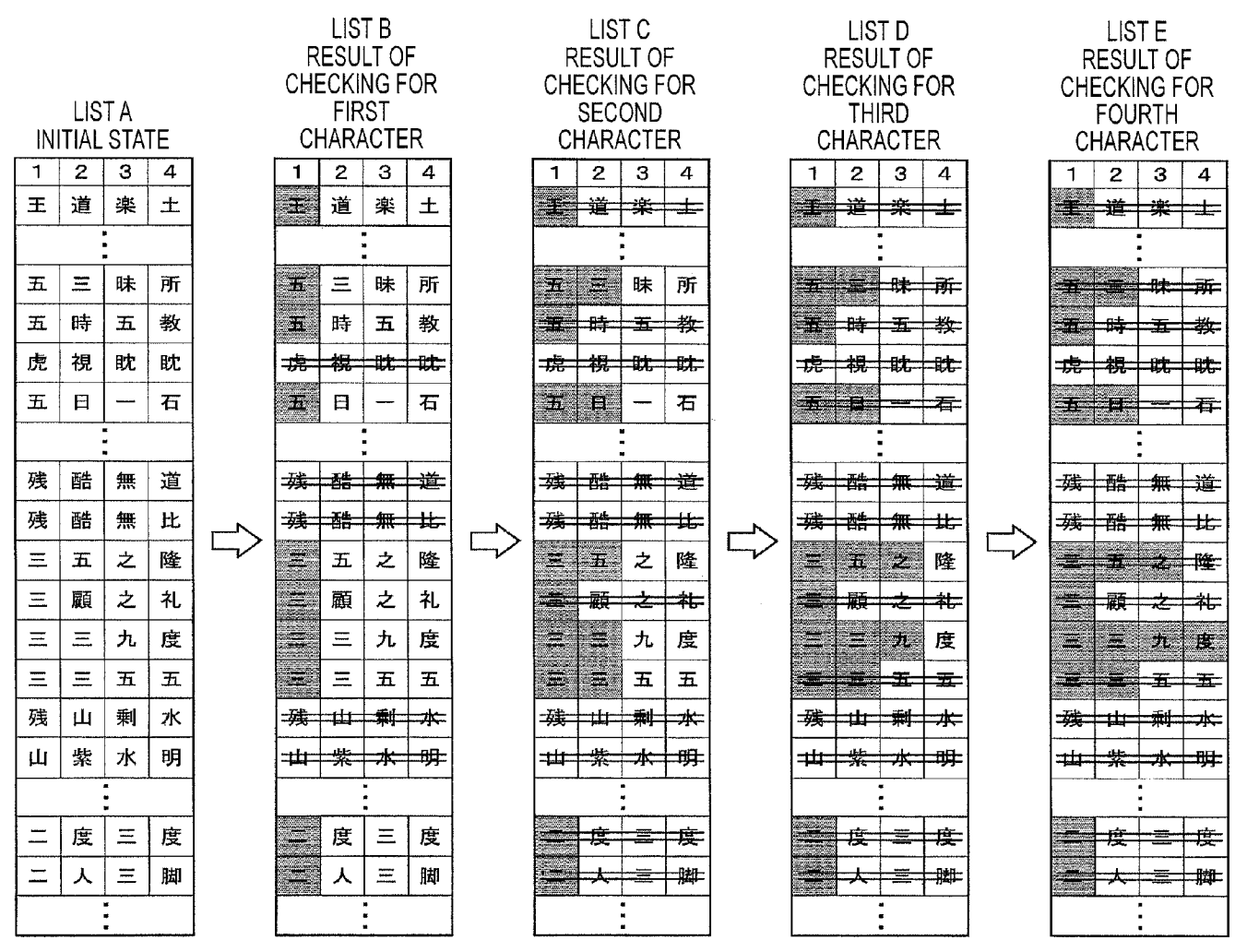

FIG. 6 shows a state in which word candidates are narrowed down by the word recognition processing unit 105 performing a checking process based on the above-described character candidates, using lists in which words to be checked are arranged vertically. Note that in the lists in the drawing the locations of component characters of each word are represented by the numbers 1, 2, 3, and 4.

In one or more embodiments of the present invention, words of the same character string length as the recognition target character string are extracted from the words registered in the word database 102, and the extracted words are set as initial word candidates. List A in FIG. 6 shows word candidates in the initial state.

In one or more embodiments of the present invention, four characters extracted by the character recognition processing unit 104 are set as processing targets in turn from the first character, and the following two narrowing-down processes are performed on each processing target character.

In a first narrowing-down process,
on two conditions that:
(1) a reliability of 60% or higher is obtained; and
(2) the difference between the maximum value of reliability obtained for the processing target character and the reliability in (1) is within 20%,
those character candidates that satisfy the conditions (1) and (2) are extracted from character candidates set for the processing target character.

In a second narrowing-down process, with word candidates currently set as valid being a target, characters arranged at the same location as the processing target character in the recognition target character string are checked against the character candidates extracted in the first narrowing-down process, and matching word candidates are extracted and other word candidates are excluded. According to this checking process, word candidates to be checked are gradually cut down and only a word that matches a combination of character candidates narrowed down in the first narrowing-down process is left finally.

Lists B to E in FIG. 6 show results of performing the above-described narrowing-down processes including a checking process of character candidates against word candidates, using the first, second, third, and fourth characters in the recognition target character string as processing targets. Specifically, while a pattern fill is applied to display fields of characters that have been found, by checking, to match the character candidates, double-lines are drawn over words that have been found, by checking, not to match any character candidate and thus have been excluded from word candidates. Those words for which a pattern fill is set but over which a double-line is drawn have been excluded from word candidates along the way.

A summary of a process performed by the word recognition processing unit 105 will be specifically described with reference to FIGS. 5 and 6.

First, according to FIG. 5, when a first narrowing-down process is performed using the first character (first character) in a recognition target character string as a processing target, character candidates having reliabilities in the range of 85% to 65% are extracted, based on the aforementioned conditions (1) and (2). Specifically, in this example, all of the five character candidates in the drawing "五", "玉", "王", "三", and "二" are extracted. In a second narrowing-down process performed thereafter, the first characters in initial word candidates (List A in FIG. 6) are checked against the five character candidates and only those words that have been found to match any of the character candidates are left as word candidates.

According to FIG. 6, in the first narrowing-down process using the first character as a processing target, for "五" which is the highest ranked character candidate there are hits including the words "五三昧所", "五時五教", and "五日一石", for "王" which is the third highest ranked character candidate there is a hit including the word "王道楽土", for "三" which is the fourth highest ranked character candidate there are hits including the words "三五之隆", "三顧之礼", "三三九度" and "三三五五", and for "二" which is the fifth highest ranked character candidate there are hits including the words "二度三度" and "二人三脚". Thus, as shown in list B in FIG. 6, 10 word hits are left as word candidates and other words are excluded from the word candidates.

Then, when the second character (second character) in the recognition target character string is used as a processing target, in a first narrowing-down process, character candidates having reliabilities in the range of 93% to 73% are extracted. Therefore, three candidates "三", "五", and "日" are extracted. In a second narrowing-down process, the second characters in the word candidates narrowed down in the process performed for the first character are checked against these character candidates. In list B in the drawing, there are five hits as a result of the checking against the character candidates, including "五三昧 所", "五日一石", "三五之隆", "三三九度" and "三三五五". Thus, as shown in list C in FIG. 6, the word candidates are narrowed down to these five words and other words ( "王道楽土", "五時五教", "三顧之礼", "二度三度" and "二人三脚".) are excluded from the word candidates.

When the third character (third character) in the recognition target character string is used as a processing target, in a first narrowing-down process, character candidates having reliabilities in the range of 89% to 69% are extracted. Therefore, three candidates "丸", "九", and "之" are extracted. In a second narrowing-down process, the third characters in the word candidates narrowed down in the process performed for the second character are checked against these character candidates. In list C in the drawing, there are two word hits as a result of the checking, including "三五之隆" and "三三九度" Thus, as shown in list D in FIG. 6, the word candidates are narrowed down to these two words and "五三昧所", "五日一石", and "三三五五", are excluded from the word candidates.

When the fourth character (fourth character) in the recognition target character string is used as a processing target, in a first narrowing-down process, character candidates having reliabilities in the range of 95% to 75% are extracted. Therefore, two candidates "度" and "度" are extracted. In a second narrowing-down process, the fourth characters in the word candidates narrowed down in the process performed for the third character are checked against these character candidates. In list D in the drawing, there is only one hit "三三九度" as a result of the checking against the character candidates. Thus, as shown in list E, only "三三九度" is left as a word candidate at the point in time of the completion of processes on all of the characters in the recognition target character string.

As such, in the example shown in FIGS. 5 and 6, the component characters in the recognition target character string are set as processing targets in turn from the first character, and first and second narrowing-down processes are performed on each processing target character, whereby only "三三九度" is finally narrowed down as a word candidate from among words consisting of four characters. Thus, by identifying the final word candidate as a word corresponding to the recognition target character string, the character string can be properly recognized.

As described above, by a first narrowing-down process, for each component character in a recognition target character string, character candidates are narrowed down to only those characters that are highly likely to correspond to the character, and by a second narrowing-down process, only those character strings in which the narrowed-down character candidates are combined are left as word candidates. Thus, a word corresponding to the recognition target character string can be easily identified. In addition, in the second narrowing-down process, only checking of one character using a limited number of character candidates is performed, and also as the process proceeds the number of word candidates to be checked decreases. Accordingly, the processing time can be significantly reduced over conventional checking processes.

In addition, when an incoming call is received during the process, the time for an incoming call informing process to become executable can be estimated from the number of remaining processing target characters at that point in time, the number of character candidates satisfying the conditions (1) and (2), the number of word candidates, etc. Thus, based on the estimation, preparations for informing of the incoming call can be made, enabling to prevent a response to the incoming call from being significantly delayed.

Figure 7:
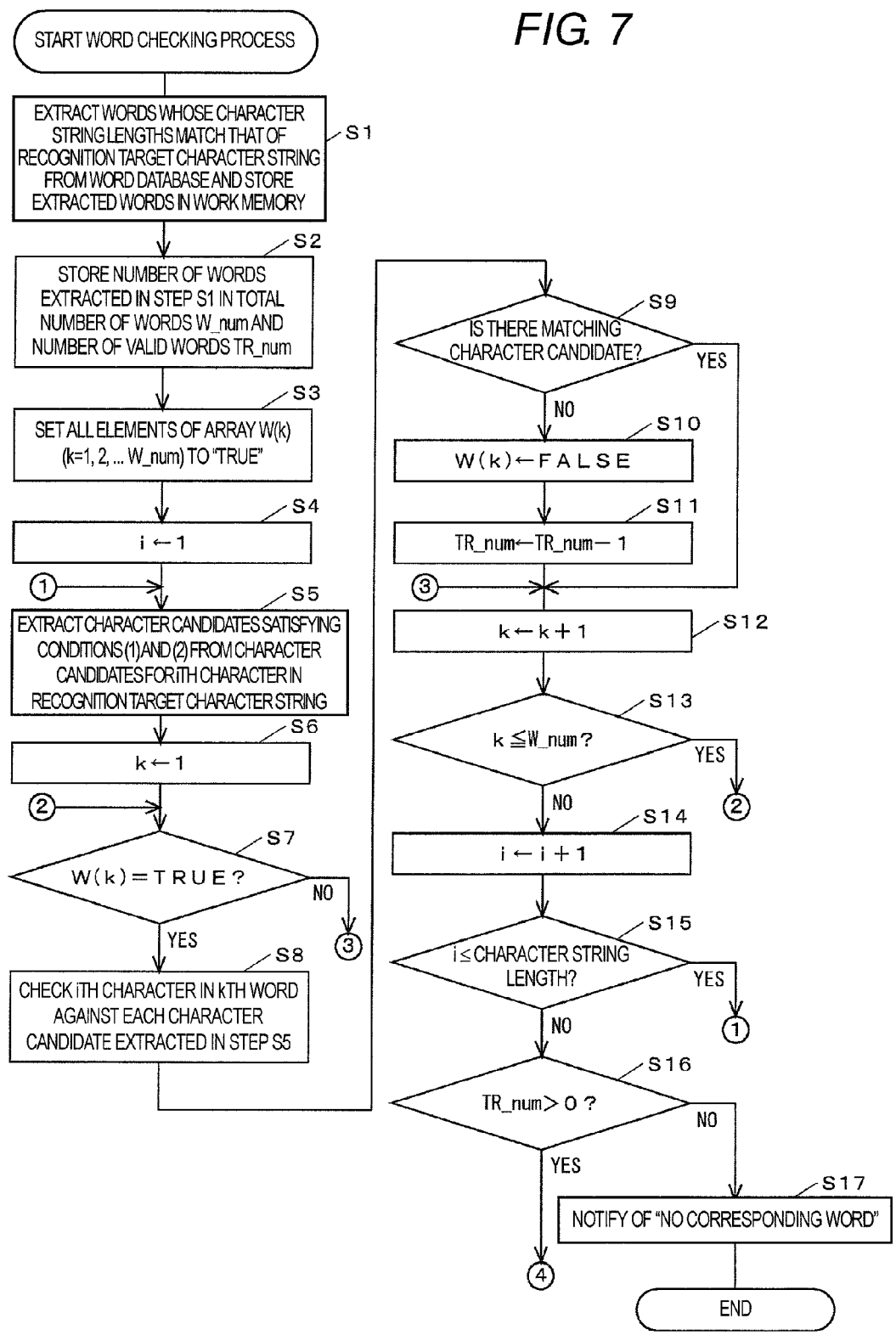
FIG. 7 is a flowchart showing a procedure of a process performed by a character recognition processing unit.
Figure 8:
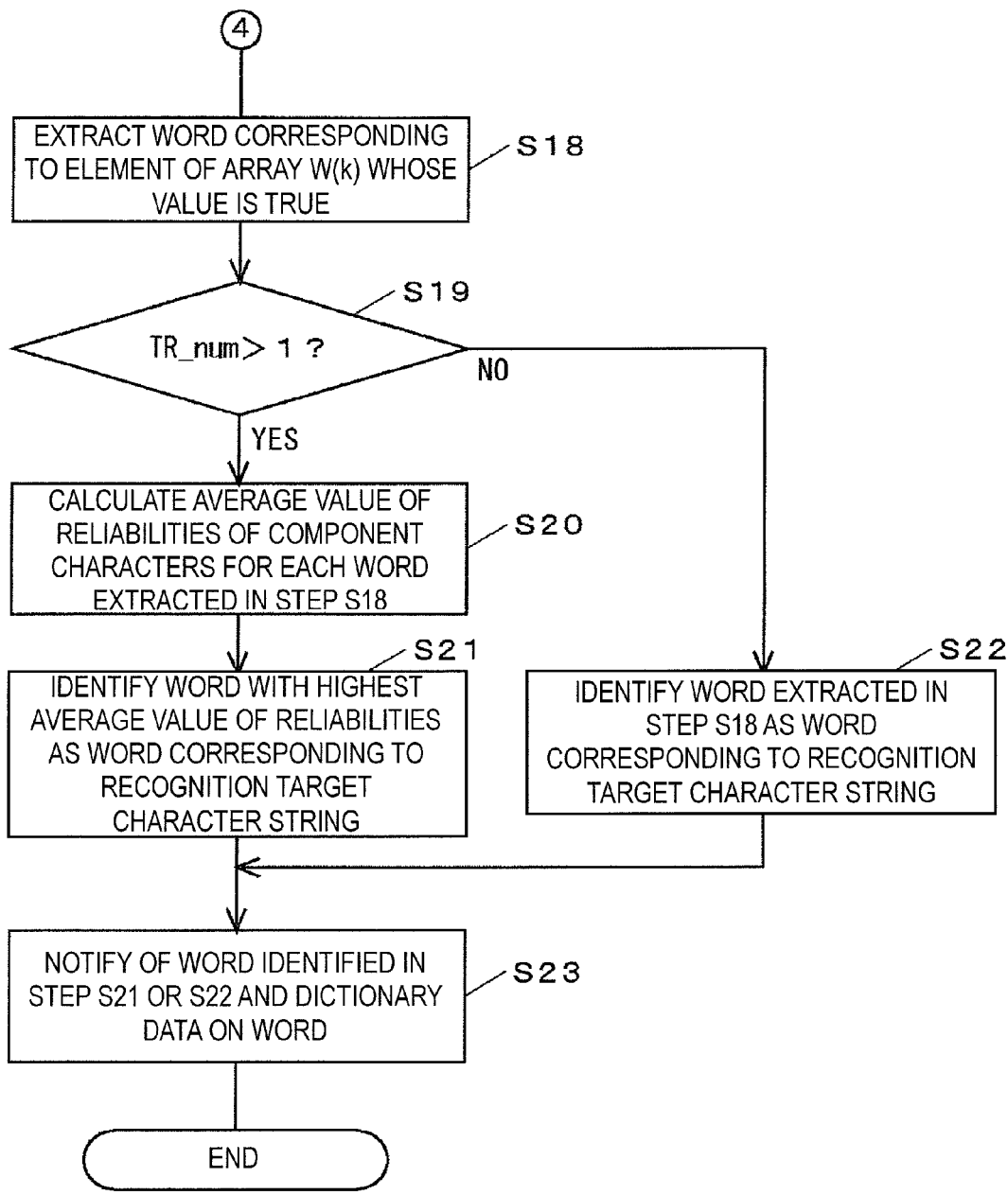
FIG. 8 is a flowchart showing a procedure continued from the process shown in FIG. 7.

FIGS. 7 and 8 show a detailed procedure of a process performed by the word recognition processing unit 105. A process performed by the word recognition processing unit 105 to identify a word corresponding to a recognition target character string will be described in detail below in accordance with the flowchart.

In the process, first, words of a character length that matches the length of a recognition target character string are extracted from the word database 102, and the extracted words are stored in the work memory 13 (step S1). In addition, the number of words extracted at this time is stored in the total number of words W_num and the number of valid words TR_num (step S2).

Then, in one or more embodiments of the present invention, whether the words stored in the work memory 13 are validated as word candidates is managed by an array W(k) (k takes values from 1 to W_num). In step S3, all elements of the array W(k) are set to "TRUE", i.e., valid.

In next step S4, a counter i for identifying a character in the recognition target character string is set to "1". With this, a first character in the recognition target character string is set as a processing target.

In step S5, those character candidates satisfying the aforementioned conditions (1) and (2) are extracted from character candidates set for the ith character in the recognition target character string. This process corresponds to a first narrowing-down process.

Thereafter, the initial value "1" is set to a counter k indicating a word to be checked (step S6). Thereafter, a checking process is performed while looking at the words in turn using the value of k (steps S7 to S13). A process by a loop of these steps S7 to S13 corresponds to a second narrowing-down process.

A specific process in the loop will be described. First, the value of the array W(k) is checked. If W(k) is TRUE (valid), then the ith character in the kth word is checked against each of the character candidates extracted in step S5 (step S8). Here, if the character to be checked matches any of the character candidates ("YES" in step S9), then the counter k is incremented, whereby the checking target is changed to a next word (step S12). On the other hand, if the character to be checked does not match any of the character candidates ("NO" in step S9), then a process of setting W(k) to FALSE (invalid) (step S10) and a process of decrementing the number of valid words TR_num (step S11) are performed and then processing proceeds to step S12. By the processes in steps S10 and S11, the kth word is excluded from word candidates.

In a stage where the first character in the recognition target character string is set as a processing target, all of the words extracted in step S1 are set as word candidates, and thus, steps S8 and S9 are performed on all of the words. Thus, the words are divided into those maintained as word candidates and those excluded from the word candidates. If the dividing process is completed ("NO" in step S13), then the counter i is incremented, whereby the processing target character is changed to a second character (step S14).

A first narrowing-down process (step S5) and a second narrowing-down process (step S7 to S13) are also performed on each of the second to last characters by the same procedure as that described above. With this, narrowing down of word candidates such as that exemplified in FIG. 6 is implemented.

If processes on all of the characters are completed and the value of i exceeds the character string length of the recognition target character string ("NO" in step S15), then the value of the number of valid words TR_num at that point in time is checked. Here, if TR_num is 0, i.e., there is no word candidate ("NO" in step S16), then the word recognition processing unit 105 notifies the recognition result correcting unit 106 and the display control unit 107 of the fact that there is no word corresponding to the recognition target character string (step S17).

On the other hand, if TR_num>0 ("YES" in step S16), then the word recognition processing unit 105 extracts a word(s) narrowed down as a word candidate(s), based on the value of k of the array W(k) whose value is set to TRUE (step S18). Here, if TR_num=1, i.e., there is one narrowed-down word candidate ("NO" in step S19), then the word extracted in the above-described step S18 is identified as a word corresponding to the recognition target character string (step S22).

On the other hand, if TR_num>1, i.e., a plurality of word candidates are left finally ("YES" in step S19), then an average value of reliabilities of component characters is calculated for each of these words (step S20). Then, a word with the highest average value is identified as a word corresponding to the recognition target character string (step S21). Note that in step S20, as the reliability of each component character, reliability set in combination with a character candidate that the component character matches is used.

In a character recognition process performed by the character recognition processing unit 104, as shown in the example in FIG. 5, there are characters that are correct characters but are not recognized as the highest ranked character candidates. However, of combinations of extracted character candidates, there are only a limited number of combinations forming character strings that make sense, and an average value of reliabilities obtained for a combination of correct characters among the combinations is highly likely to be higher than average values of reliabilities obtained for other combinations. Thus, by performing processes in steps S20 and S21 when a plurality of word candidates are left finally, the correct word can be identified with high probability.

In the last step S23, the word recognition processing unit 105 notifies the recognition result correcting unit 106 of the word identified in the above-described step S21 or S22, and provides dictionary data on the word to the display control unit 107.

The recognition result correcting unit 106 having received the notification checks the notified word against a recognition result character string provided from the character recognition processing unit 104. If the two differ, then the recognition result correcting unit 106 replaces the recognition result character string by the word provided from the word recognition processing unit 105. The display control unit 107 displays a screen (B) shown in FIG. 3, using the final recognition result character string and the dictionary data provided from the word recognition processing unit 105.

When the number of valid words TR_num obtained when the processes on all of the characters are completed is 0 ("NO" in step S16) and the recognition result correcting unit 106 and the display control unit 107 are notified of the fact that there is no corresponding word (step S17), the recognition result correcting unit 106 passes the recognition result character string provided from the character recognition processing unit 104 as it is without making the above-described correction, to the display control unit 107.

Figure 9:
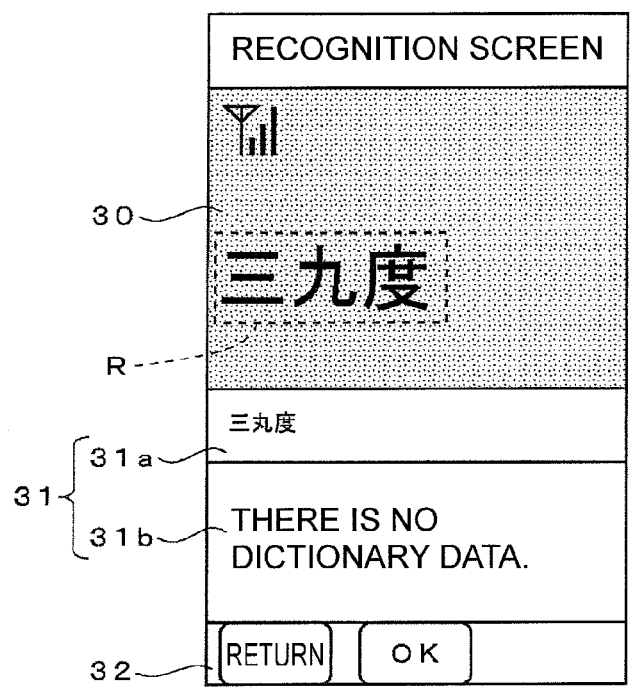
FIG. 9 is a diagram showing an example of a display screen for when a word cannot be recognized.
Figures 10A, 10B, 10C:
FIGS. 10A to 10C are diagrams showing an image of a recognition target character string, exemplary settings of character candidates, and a correspondence relationship between a combination of character candidates and a result of checking, for a conventional recognition process.

FIG. 9 shows an example of a result display screen for when an image is created that does not include the first character "三" in the character string "三三 九度", which is to be recognized, and a recognition process is performed on the image.

In this example, since there is no word candidate left finally and thus dictionary data is not passed to the display control unit 107, the message "There is no dictionary data." is displayed in a dictionary data appearing field 31b. In addition, in a recognition result character string display field 31a above the dictionary data appearing field 31b, a recognition result character string generated by the character recognition processing unit 104 is displayed without correction. This is because it is assumed that in this example as well, the same recognition results as those shown in FIG. 5 are obtained for the characters "三" "九", and "度" in the image. In this case, since the word recognition processing unit 105 has not been able to identify a word corresponding to the recognition target character string, a process by the recognition result correcting unit 106 is not performed, and thus, by a combination of the highest ranked character candidates set for the respective component characters, the wrong recognition result character string "三丸度" is displayed.

When, as in the above-described example, a character string that does not make sense is set as a recognition target character string, since a corresponding word is not registered in the word database 102, the correct recognition result may not be displayed. However, providing such display allows the user to realize that the presence of dictionary data affects the accuracy of recognition.

Note that although, in the process shown in FIGS. 7 and 8, words serving as initial word candidates are extracted from the word database 102 and stored in the work memory 13, and the valid/invalid of the words are managed by an array W(k) and the valid/invalid of all of the words including those words excluded from word candidates are checked each time, the algorithm is not limited thereto. For example, without setting an array W(k), those candidates excluded from word candidates may be deleted from the work memory 13 and words left in the work memory 13 may be checked against character candidates each time. By doing so, the process of checking whether words are valid or invalid becomes unnecessary, enabling to further increase the speed of the process.

Note also that although, in the above-described embodiments, words of a character length (four characters) that matches the length of a recognition target character string are extracted from the word database 102 and set as initial word candidates, the configuration is not limited thereto and words whose numbers of component characters differ from that of the recognition target character string (larger or smaller numbers of component characters) may be included in initial word candidates.

In addition, all of the words included in the word database 102 may be set as initial word candidates. Furthermore, although in the above-described embodiments an extraction process based on the character length of a word is performed when some words are extracted from the word database 102 and set as initial word candidates, the configuration is not limited thereto and words serving as initial word candidates may be extracted based on the type of character (e.g., alphabetic characters, kanji, and katakana), etc.

Although, in the above-described embodiments, component characters in a recognition target character string are set as processing targets in turn from the first character and then first and second narrowing-down processes are performed, processing target characters may be reversely selected in turn from the last character in a character arrangement direction and the same narrowing-down processes may be performed.

Furthermore, the recognition target character string is not limited to a string of Japanese characters and a recognition process targeted for foreign languages such as English and Korean can also be performed as long as the data components of the word database 102 can be arranged. In addition, the recognition target character string is not limited to a character string in an image created by the camera 2, and a character string drawn by a drawing application, etc., may be used as a target.

In addition, although in the above-described embodiments a final recognition result character string is displayed together with dictionary data, when this function is applied to OCR software, only a recognition result character string may be displayed. Alternatively, instead of display, text data and dictionary data on a recognition result character string may be outputted to a work data file of other applications (an email editor, a notepad, etc.) or a recognition result character string may be converted to audio and outputted from a speaker.

The above-described recognition process can be applied not only to mobile phones but also to other mobile devices and personal computers. In addition, by incorporating the functions of the word recognition processing unit 105 and the recognition result correcting unit 106 shown in FIG. 4 into a personal computer having installed thereon existing OCR software, an error in a result recognized by the OCR software can be corrected.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A word recognition method in which as a result of a recognition process performed on an image of a character string, one or more character candidates are obtained for each of characters forming the character string, according to which a word corresponding to the character string is recognized using a word database having registered therein a plurality of words, the word recognition method comprising:

setting a predetermined number of words included in the word database, as initial word candidates;

performing a process in which the characters forming the recognition target character string are set as processing targets, one character by one character, and every time a processing target character is set, word candidates present at a time of the setting are narrowed down to words in which any of character candidates obtained for the processing target character are arranged at a same location as a location where the processing target character is arranged in the recognition target character string, by excluding words in which character candidates obtained for the processing target character are not arranged at a same location as a location where the processing target character is arranged in the recognition target character string, without generating string candidates by combining the character candidates; and identifying, when a narrowing-down process performed on a last processing target character in the recognition target character string is completed, a word corresponding to the character string from among word candidates extracted at a point in time of the completion of the narrowing-down process.

2. The word recognition method according to claim 1, wherein every time the processing target character is set, a process is performed in which character candidates having reliabilities exceeding a permitted value which is obtained based on a condition predetermined in the recognition process are extracted from among character candidates obtained for the processing target character in the recognition process, and word candidates are narrowed down using exclusively the extracted character candidates.

3. The word recognition method according to claim 1, wherein in a process of setting the initial word candidates, of the words registered in the word database, words whose numbers of component characters match that of the recognition target character string are set as initial word candidates.

4. The word recognition method according to claim 1, wherein when a plurality of word candidates are extracted upon completion of the narrowing-down process performed on the last processing target character in the recognition target character string, for each of the word candidates an average value of reliabilities of character candidates for respective characters that form the word candidate is calculated, and a word candidate with a highest average value of reliabilities is identified as a word corresponding to the character string.

5. A non-transitory computer-readable medium storing a word recognition program for causing a computer in which a word database having registered therein a plurality of words is set and as a result of a recognition process performed on an image of a character string, one or more character candidates are obtained for each of characters forming the character string, to perform a process of recognizing a word corresponding to the character string, the word recognition program causing the computer to function as:

an initial setting unit that initially sets a predetermined number of words registered in the word database, as word candidates;

a narrowing-down unit that performs a process in which the characters forming the recognition target character string are set as processing targets, one character by one character, and every time a processing target character is set, word candidates present at a time of the setting are narrowed down to words in which any of character candidates obtained for the processing target character are arranged at a same location as a location where the processing target character is arranged in the recognition target character string, by excluding words in which character candidates obtained for the processing target character are not arranged at a same location as a location where the processing target character is arranged in the recognition target character string, without generating string candidates by combining the character candidates;

a word identifying unit that identifies, when a narrowing-down process performed on a last processing target character in the recognition target character string is completed, a word corresponding to the character string from among word candidates extracted at a point in time of the completion of the narrowing-down process; and an output unit that outputs the word identified by the word identifying unit, as a recognition result.

6. An information processing device comprising:

a word database having registered therein a plurality of words;

a character recognizing unit that performs a recognition process on an image of a character string to obtain one or more character candidates for each of characters forming the character string; and a word recognizing unit that recognizes a word corresponding to the character string, using the word database and recognition results obtained by the character recognizing unit, the information processing device further comprising:

an initial setting unit that initially sets a predetermined number of words registered in the word database, as word candidates;

a narrowing-down unit that performs a process in which the characters forming the recognition target character string are set as processing targets, one character by one character, and every time a processing target character is set, word candidates present at a time of the setting are narrowed down to words in which any of character candidates obtained for the processing target character are arranged at a same location as a location where the processing target character is arranged in the recognition target character string, by excluding words in which character candidates obtained for the processing target character are not arranged at a same location as a location where the processing target character is arranged in the recognition target character string, without generating string candidates by combining the character candidates;

a word identifying unit that identifies, when a narrowing-down process performed on a last processing target character in the recognition target character string is completed, a word corresponding to the character string from among word candidates extracted at a point in time of the completion of the narrowing-down process; and an output unit that outputs the word identified by the word identifying unit, as a recognition result.

* * * * *